US011386310B2

(12) United States Patent
Aggarwal et al.

(10) Patent No.: US 11,386,310 B2
(45) Date of Patent: Jul. 12, 2022

(54) SYSTEMS FOR FONT REPLACEMENT IN PRINT WORKFLOWS

(71) Applicant: Adobe Inc., San Jose, CA (US)

(72) Inventors: Vipul Aggarwal, New Delhi (IN); Lakshay Kumar, New Delhi (IN); Bhavna Sardana, Gurugram (IN); Amit Sharma, New Delhi (IN)

(73) Assignee: Adobe Inc., San Jose, CA (US)

( * ) Notice: Subject to any disclaimer, the term of this patent is extended or adjusted under 35 U.S.C. 154(b) by 74 days.

(21) Appl. No.: 17/025,000

(22) Filed: Sep. 18, 2020

(65) Prior Publication Data

US 2022/0092370 A1    Mar. 24, 2022

(51) Int. Cl.
   G06K 15/02     (2006.01)
   G06K 9/62      (2022.01)
   G06N 20/00     (2019.01)

(52) U.S. Cl.
   CPC ......... G06K 15/1827 (2013.01); G06K 9/628 (2013.01); G06K 9/6256 (2013.01); G06K 15/1836 (2013.01); G06N 20/00 (2019.01)

(58) Field of Classification Search
   CPC .................................................. G06K 15/1827
   USPC ....................................................... 358/1.11
   See application file for complete search history.

(56) References Cited

U.S. PATENT DOCUMENTS

| 2018/0082156 | A1* | 3/2018 | Jin | G06F 40/109 |
| 2018/0114097 | A1* | 4/2018 | Wang | G06V 30/245 |
| 2021/0191925 | A1* | 6/2021 | Sianez | G06F 16/248 |

OTHER PUBLICATIONS

Devlin, Jacob et al., "BERT: Pre-Training of Deep Bidirectional Transformers for Language Understanding", arXiv.org [retrieved on Aug. 10, 2020], Retrieved from the Internet <https://arxiv.org/abs/1810.04805v2>., May 24, 2019, 16 pages.
Nabi, Javaid , "Building a Multi-label Text Classifier using BERT and TensorFlow", Medium, Towards Data Science Publication, [retrieved Oct. 5, 2020], Retrieved from the Internet <https://towardsdatascience.com/building-a-multi-label-text-classifier-using-bert-and-tensorflow-f188e0ecdc5d>., May 11, 2019, 12 pages.

* cited by examiner

*Primary Examiner* — Jacky X Zheng
(74) *Attorney, Agent, or Firm* — FIG. 1 Patents (57) ABSTRACT

In implementations of systems for font replacement in print workflows, a computing device implements a print system to receive print request data describing a document having a corpus of text rendered using a font that is not available to the print system. The print system extracts the corpus of text from the document and generates an indication of a context category of the corpus of text using a machine learning model training to classify context categories of text inputs using training data describing a different corpus of text. A replacement font is identified based on the indication of the context category from replacement font data describing a plurality of candidate replacement fonts. The printing system generates a raster image depicting the corpus of text rendered using the replacement font.

20 Claims, 9 Drawing Sheets

502
Receive print request data describing a document having a corpus of text rendered using a font that is not available to a raster image processing system

504
Extract the corpus of text from the document

506
Generate an indication of a context category of the corpus of text by processing the corpus of text using a machine learning model trained to classify context categories of text inputs using training data describing a different corpus of text

508
Identify a replacement font from replacement font data describing a plurality of candidate replacement fonts, the replacement font identified based on the indication of the context category

510
Generate a raster image depicting the corpus of text rendered using the replacement font

SYSTEMS FOR FONT REPLACEMENT IN PRINT WORKFLOWS

BACKGROUND

In conventional digital printing workflows, a raster image processor (RIP) receives print request data, and the RIP converts the print request data into a raster image to be printed. This raster image describes the print request data in a format which a printing device is capable of outputting on a substrate such as paper or fabric. If the print request data describes a document having text rendered using a particular font, then the RIP accesses a font file of the particular font in order to generate a raster image depicting the text rendered using the particular font.

If this font file is not available to the RIP (e.g., the font file is not included in the print request data), then the RIP replaces the particular font with a default font. The RIP accesses a font file of the default font and generates the raster image depicting the text of the document rendered using the default font (e.g., Helvetica). The printing device receives this raster image and outputs the raster image on the substrate. Since conventional systems replace the particular font with the default font, visual features of the particular font are not depicted on the substrate such as visual features which convey style, mood, tone, and so forth. It is also possible that the default font conveys context which conflicts with context conveyed by the substance of the text, for example, the default font has visual features that convey an optimistic tone and the substance of the text conveys a pessimistic tone.

SUMMARY

Techniques and systems are described for font replacement in print workflows. In an example, a computing device implements a print system to receive print request data describing a document having a corpus of text rendered using a font that is not available to the print system. For example, a font file for the font is not included in the print request data. The print system extracts the corpus of text from the document as raw text in one example.

An indication of a context category conveyed by the corpus of text is generated by processing the extracted corpus of text using a machine learning model trained to classify context categories of text inputs using training data describing a different corpus of text. The print system identifies a replacement font based on the indication of the context category from replacement font data describing a plurality of candidate replacement fonts. For example, the replacement font conveys contexts which are similar to contexts conveyed by the corpus of text. The print system generates a raster image depicting the corpus of text rendered using the replacement font.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

In conventional digital printing systems, a raster image processor (RIP) receives print request data, and the RIP converts the print request data into a raster image to be printed. If the print request data describes a document having text rendered using a specific font that is not available to the RIP, then the RIP replaces the specific font with a default font. For example, the RIP generates the raster image depicting the text rendered using the default font. Since the default font is used in place of the specific font, contextual features conveyed by the specific font are lost in the raster image. For example, the default font does not convey tones and moods conveyed by the specific font and the default font does not necessarily convey context which is consistent with context conveyed by a substance of the text.

To overcome the limitations of conventional systems, techniques and systems are described for font replacement in print workflows. In one example, a computing device implements a print system to receive print request data describing a document having a corpus of text rendered using a font that is not available to the print system. For example, a font file for the font is not included in the print request data. Because the font is not available to the print system, the print system determines contexts conveyed by the corpus of text and identifies a replacement font based on the contexts conveyed by the corpus of text.

To determine the contexts conveyed by the corpus of text, the print system extracts the corpus of text from the document. In one example, the print system processes the print request data and identifies text objects included in the document. The print system then uses these text objects to interpret sequences of character codes which the print system extracts to form raw text. The extracted corpus of text is independent of the unavailable font and the print system tokenizes the corpus of text and lemmatizes the tokenized corpus of text in this example. By tokenizing and lemmatizing the corpus of text in this way, the print system formats the corpus of text for processing using language representation machine learning models.

The print system processes the corpus of text using a machine learning model trained to classify context categories of text inputs using training data describing a different corpus of text. For example, the machine learning model includes bidirectional encoder representations from transformers. In this example, training of the machine learning model includes training to perform unsupervised tasks of identifying randomly masked tokens and determining whether a second sentence follows a first sentence. In one example, the machine learning model generates token sequence embeddings that indicate contexts based on the corpus of text and the token sequence embeddings are classified by classification layers.

A first classification layer of the classification layers is trained using labeled training data to classify tone classes of joyful, neutral, optimistic, pessimistic, friendly, humorous, and sad in one example. For example, a second classification layer is trained using labeled training data to classify formality classes of formal, informal, and neutral. In this example, a third classification layer is trained using labeled training data to classify content type classes of academic, business, general, e-mail, report, article, novel, magazine, children's book, comics, legal, scientific, and advertisement.

The trained classification layers receive and process the token sequence embeddings and generate indications of classes. For example, the indications of classes output by each classification layer are converted into vectors of probabilities using a Softmax layer for each classification layer. These vectors of probabilities are then concatenated into a single vector of context scores. This vector of context scores is indicative of contexts conveyed by the corpus of text and the print system uses the vector of context scores to identify the replacement font.

To do so, the print system accesses replacement font data that describes contexts conveyed by a plurality of different fonts which are available to the print system. For example, the replacement font data describes a vector of conveyance indicators for classes of tone, formality, and content type for each of the plurality of different fonts. The conveyance indicators are binary in one example such that an indicator has a value of "1" if a class of context is conveyed and a value of "0" otherwise.

The print system determines a replacement font score for each of the plurality of different fonts described by the replacement font data. These replacement font scores are indicative of an overlap between contexts likely conveyed in the corpus of text and contexts conveyed by the fonts included in the replacement font data. In one example, the print system determines each of the replacement font scores by computing a dot product between the vector of context scores and each of the vectors of conveyance indicators. By determining the replacement font score in this way, a font which conveys context that is also likely conveyed by the corpus of text has a higher replacement font score than a font which does not convey context that is likely conveyed by the corpus of text.

The print system identifies a replacement font as the font described by the replacement font data that has a highest replacement font score. The print system uses a font file of the replacement font to generate a raster image depicting the corpus of text rendered using the replacement font. By replacing the unavailable font with the replacement font based on context conveyed by the replacement font and the context conveyed by the corpus of text, the described techniques improve conventional font replacement systems.

Unlike conventional systems which replace an unavailable font with a single default font that is unrelated to a substance of text rendered using the unavailable font, the described systems replace the unavailable font based on the substance of the text. As a result of the described systems, the replacement font used in place of the unavailable font conveys contexts which are similar to contexts conveyed by the substance of the text. This is true regardless of whether the unavailable font also conveys similar contexts.

The described systems also improve conventional font replacement technology which generates indications of replacement fonts based on a visual similarity between an unavailable font and multiple available fonts. These conventional font replacement techniques generate similarity scores between the unavailable font and the available fonts which are calculated from Euclidean distances between a feature vector representation of an image of text rendered using the unavailable font and feature vector representations of images of text rendered using the available fonts. However, calculation of a feature vector for an unavailable font is a computationally expensive operation which consumes substantial resources of the computing device. Because the described systems avoid such a calculation, the described systems identify replacement fonts with improved efficiency relative to conventional font replacement systems.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

Figure 1:
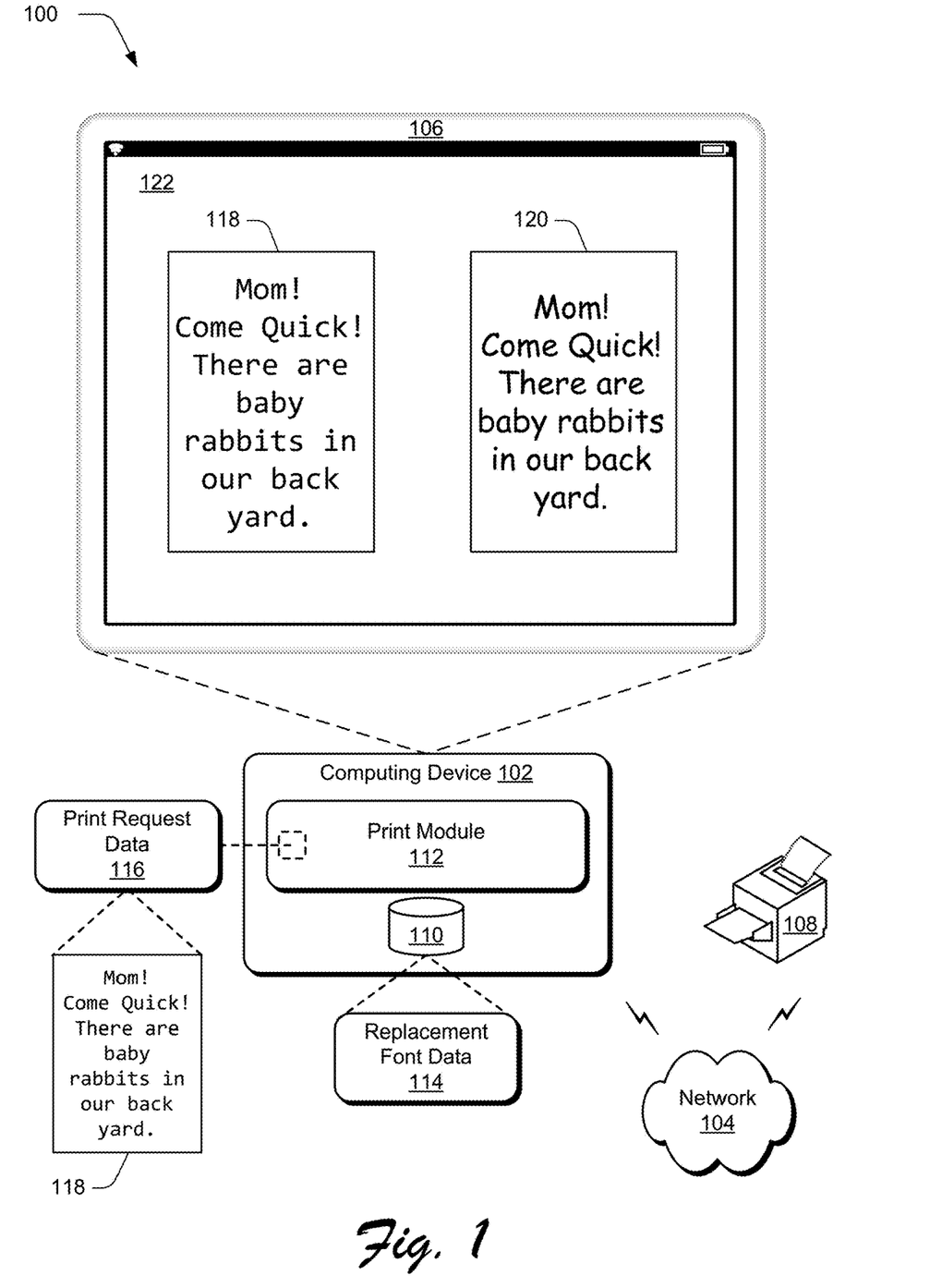
FIG. 1 is an illustration of an environment in an example implementation that is operable to employ digital systems and techniques for font replacement in print workflows as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. As shown, the environment 100 includes a printing system 108 which is connected to the network 104 and the printing system 108 is communicatively connected to the computing device 102 via the network. In some examples, the printing system 108 is communicatively coupled to the computing device 102 as part of a wired or wireless connection.

The printing system 108 is representative of functionality which includes an entire digital printing workflow in some examples. In other examples, the printing system 108 is representative of functionality which includes a portion of a digital printing workflow or multiple portions of the digital printing workflow. For example, the printing system 108 includes at least one printing device which is capable of outputting on physical and electronic substrates. In one example, the printing system 108 includes a raster image processor (RIP). In another example, the printing system 108 receives output data (e.g., raster image data) from a RIP included as part of the computing device 102. In some examples, the printing system 108 sends data to a RIP, for example, as part of a digital printing workflow.

The computing device 102 includes a storage device 110 and print module 112. The storage device 110 is illustrated to include replacement font data 114. The replacement font data 114 describes contexts conveyed by each of a plurality of different fonts which have associated font files that are available to the computing device 102, the print module 112, and/or the printing system 108. In one example, the contexts conveyed by each of the plurality of different fonts included in the replacement font data 114 are based on tags which indicate whether a particular font conveys a particular class of context or whether the particular font does not convey the particular class of context. For example, the replacement font data 114 describes indications of tone, formality, and/or content type conveyed by each of the plurality of different fonts.

Consider an example in which the replacement font data 114 describes a vector of conveyance indicators for classes of tone, formality, and/or content type for each of the plurality of different fonts. In one example, these conveyance indicators are binary such that an indicator value is "1" if a class is conveyed and the indicator value is "0" otherwise. In this example, the replacement font data 114 describes the vector of conveyance indicators for tone classes of joyful, neutral, optimistic, pessimistic, friendly, humorous, and/or sad. Continuing this example, the replacement font data 114 describes the vector of conveyance indicators for formality classes of formal, informal, and/or neutral as well as for content type classes of academic, business, general, e-mail, report, article, novel, magazine, children's book, comics, legal, scientific, and/or advertisement.

The print module 112 is illustrated as receiving, transmitting, and/or having print request data 116 that describes digital content to be printed. This digital content includes digital documents, digital graphics, digital images, and so forth. In the illustrated example, the print request data 116 includes a document having text rendered using an unavailable font 118. The print module 112 processes the print request data 116 and extracts the text rendered using the available font 118 from the document. For example, the print module 112 tokenizes the extracted text and lemmatizes the tokenized text.

The print module 112 processes this extracted text using a machine learning model trained to classify context categories of tone, formality, and/or content type of text inputs using training data describing a corpus of text. The print module 112 concatenates classifications generated by the machine learning model into a vector of context scores. For example, these context scores are indicative of contexts conveyed by the extracted text. In this example, the vector of context scores is similar to the vectors of conveyance indicators described by the replacement font data 114 except that the vector of context scores includes context scores instead of context indicators.

In an example, the vector of context scores includes context scores for classes of tone, formality, and/or content type for the text rendered using the unavailable font 118. These context scores are probabilistic scores which represent probabilities of the text rendered using the unavailable font 118 conveying classes of tone, formality, and/or content type. In one example, the vector of context scores includes conveyance scores for tone classes of joyful, neutral, optimistic, pessimistic, friendly, humorous, and/or sad as well as for formality classes of formal, informal, and/or neutral for the text rendered using the unavailable font 118. In this example, the vector of context scores includes conveyance scores for content type classes of academic, business, general, e-mail, report, article, novel, magazine, children's book, comics, legal, scientific, and/or advertisement which are generated by the trained machine learning model based on the extracted text from the document.

The print module 112 accesses the replacement font data 114 and determines a replacement font score for each of the plurality of different fonts described by the replacement font data 114. For example, a replacement font score for a particular font indicates whether the particular font conveys contexts that are conveyed in the text rendered using the unavailable font 118. To determine these replacement font scores, the print module 112 computes a dot product between the vector of context scores for the extracted text and the vector of conveyance indicators for each of the fonts described by the replacement font data 114. The result of a computed dot product between the vector of context scores and a vector of conveyance indicators for a particular font described by the replacement font data 114 is the replacement font score for the particular font. The print module 112 compares the determined replacement font scores and identifies a font associated with a highest replacement font score as a replacement font.

Because the conveyance indicators are binary in one example, the replacement font conveys contextual classes which correspond to relatively high probabilistic context scores for contextual classes conveyed by the text that is rendered using the unavailable font 118. The print module 112 accesses a font file of the replacement font and uses the replacement font to render the extracted text from the document in a raster image 120 which is displayed in a user interface 122 of the display device 106. As shown, the document having the text rendered using the unavailable font 118 is also displayed in the user interface 122.

For example, a vector of conveyance indicators described by the replacement font data 114 for the replacement font includes an indicator value of "1" for the tone class of joyful, an indicator value of "1" for the tone class of optimistic, an indicator value of "1" for the formality class of informal, and an indicator value of "1" for the content type class of children's book. In this example, the vector of context scores for the text rendered using the unavailable font 118 includes a relatively high score for the tone class of joyful. This is because a context of the text rendered using the unavailable font 118 is joyful. For example, a child is excited to see baby rabbits and the child calls its mother to share the joy of the baby rabbits.

Continuing the previous example, the vector of context scores for the text rendered using the unavailable font 118 includes a relatively high score for the tone class of optimistic. This is because the context of the text rendered using the unavailable font 118 is optimistic. For example, the exclamation points following "mom" and "come quick" suggest excitement and optimism from the child. The context of "come quick" also indicates optimism with instructions to increase a probability of the child and mother both seeing the baby rabbits in the back yard.

For example, the vector of context scores for the text rendered using the unavailable font 118 includes a relatively high score for the formality class of informal because a context of the text rendered using the unavailable font 118 is informal. In this example, the contextual substance is conversational and includes short and simple statements as in a child shouting to its mother. This conversational context is informal and therefore a context score for the formality class of informal is relatively high.

The vector of context scores for the text rendered using the unavailable font 118 includes a relatively high score for the content type class of children's book because a context of this text is highly suggestive of a plot of book written for children. The words are short and easy to read as in books for children. The subject matter of "baby rabbits" is fun, uncontroversial, and easily illustrated as in a child's book.

A comparison of the text rendered using the unavailable font 118 and the text rendered using the replacement font depicted in the raster image 120 indicates that there is little visual similarity between the unavailable font and the replacement font. Unlike conventional systems which suggest fonts that are visually similar to an unavailable font, the print module 112 identifies the replacement font based on context conveyed by the replacement font and context conveyed in the text that is rendered using the unavailable font 118. Thus, rather than having a visual similarity to the unavailable font, the replacement font conveys context similar to context conveyed by a substance of the text rendered using the unavailable font 118. By identifying the replacement font in this way, the print module 112 visually conveys context similar to context conveyed in the substance of the text regardless of whether or not the unavailable font also conveys such similar visual context which improves conventional systems that replace fonts based on visual similarity.

Figure 2:
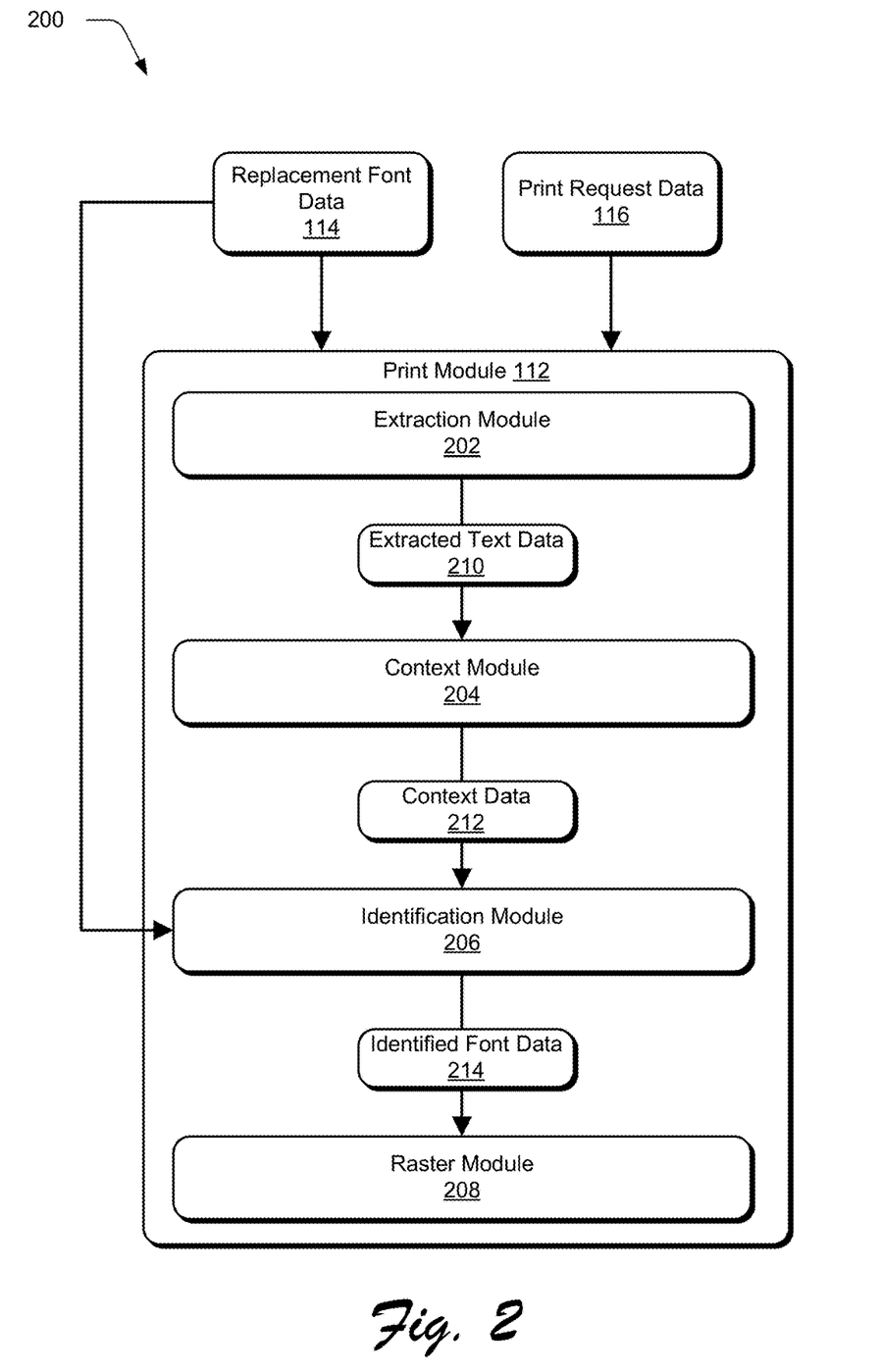
FIG. 2 depicts a system in an example implementation showing operation of a print module for font replacement in print workflows.

FIG. 2 depicts a system 200 in an example implementation showing operation of a print module 112. The print module 112 is illustrated to include an extraction module 202, a context module 204, an identification module 206, and a raster module 208. As shown, the print module 112 receives the replacement font data 114 and the print request data 116 as inputs. For example, the extraction module 202 receives the print request data 116 and processes the print request data 116 to generate extracted text data 210.

Figure 3A:
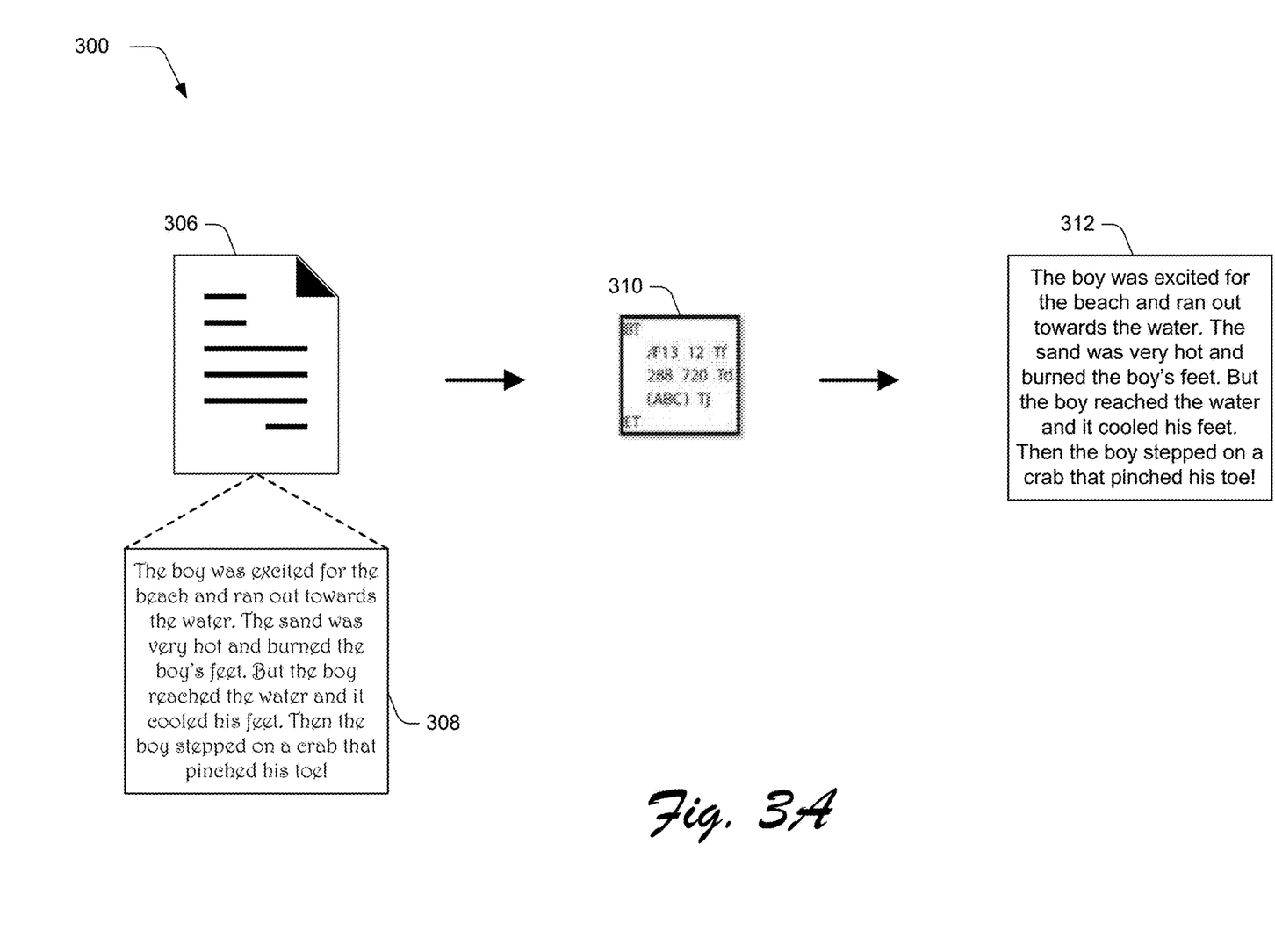
FIGS. 3A, 3B, and 3C illustrate representations of font replacement in a print workflow.
Figure 3B:
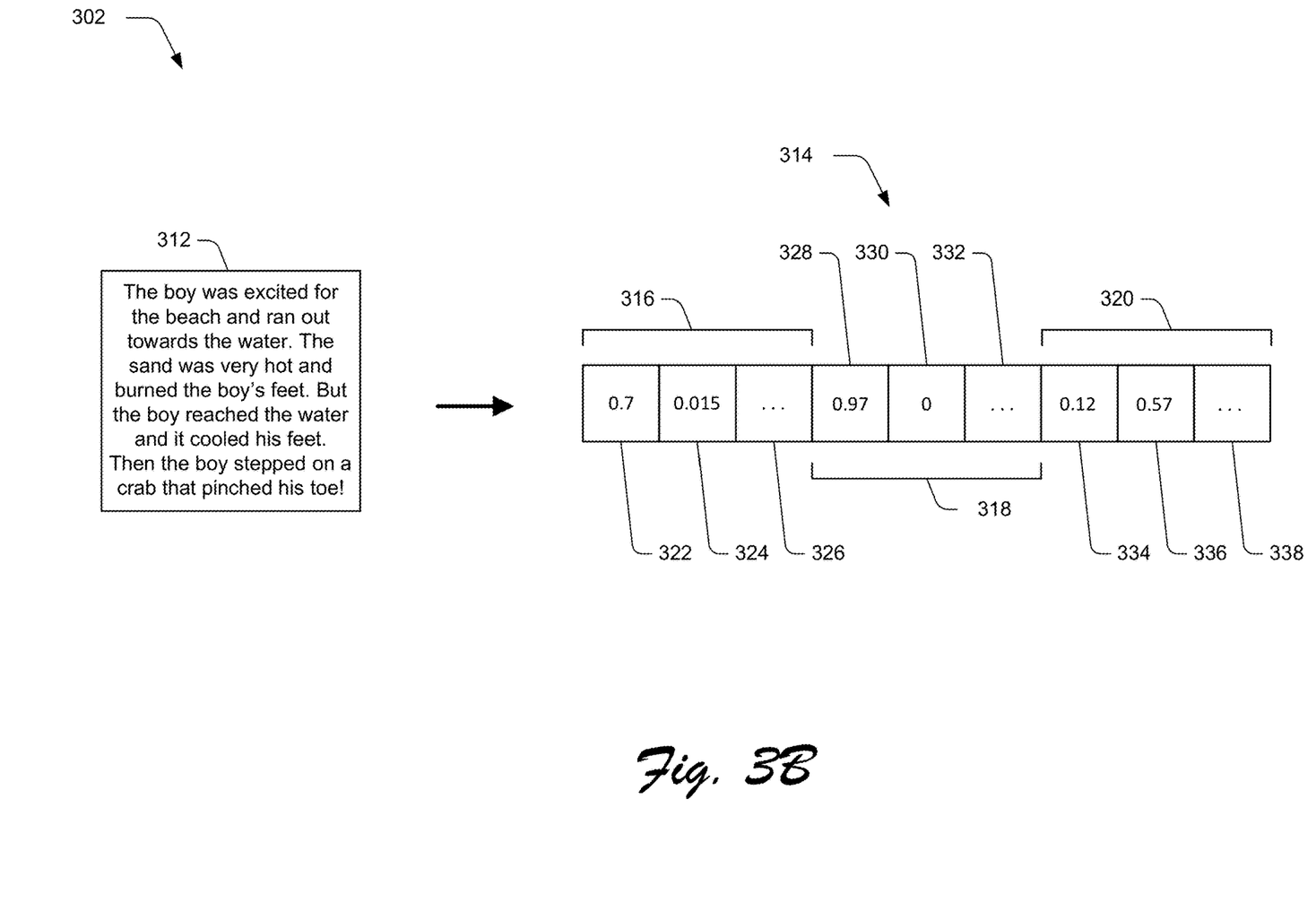
Figure 3C:
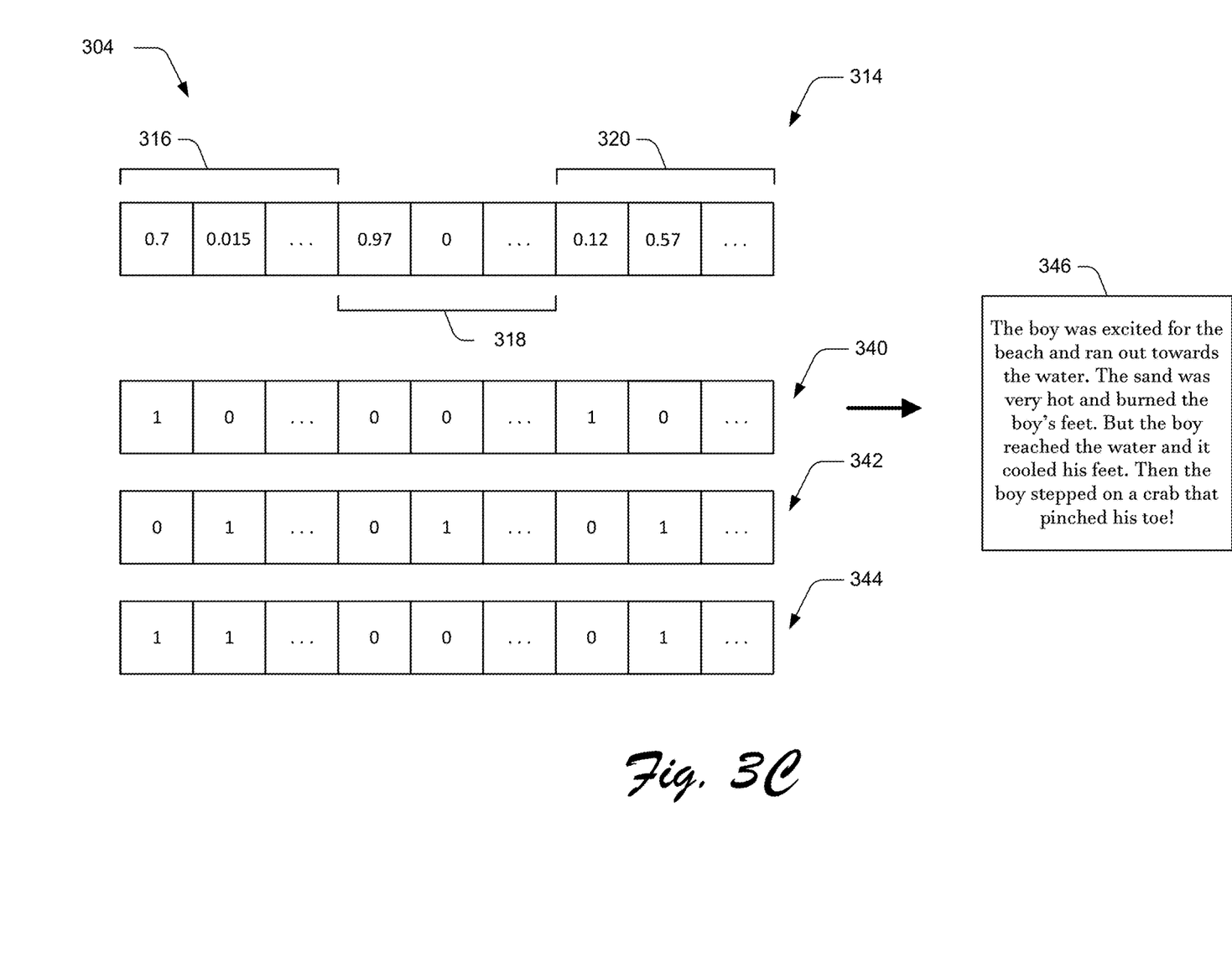

FIGS. 3A, 3B, and 3C illustrate representations of font replacement in a print workflow. FIG. 3A illustrates a representation 300 of extracting text from a document. FIG. 3B illustrates a representation 302 of generating a vector of context scores for the extracted text. FIG. 3C illustrates a representation 304 of identifying a replacement font using the vector of context scores for the extracted text and vectors of context indicators for fonts described by the replacement font data 114.

As shown in FIG. 2 and FIG. 3A, the extraction module 202 receives the print request data 116 which is illustrated to include a document 306 having text rendered using an unavailable font 308. For example, a font file for the unavailable font is not included in the print request data 116. The extraction module 202 processes the print request data 116 to extract the text from the document 306 by identifying text objects included in the document 306 and interpreting values of starting positions and string objects as sequences of character codes 310. The extraction module 202 extracts the sequences of character codes 310 from the print request data 116 and uses the sequences of character codes 310 to form raw text 312. The extraction module 202 generates the extracted text data 210 as describing the raw text 312.

The context module 204 receives the extracted text data 210 and processes the extracted text data 210 to generate context data 212. For example, the context module 204 includes a machine learning model such as a model having bidirectional encoder representations from transformers which is trained to generate context scores based on text inputs. In this example, the context module 204 generates a vector of context scores 314 for the raw text 312.

As shown in FIG. 3B, the vector of context scores 314 includes context scores for classes of tone 316, formality 318, and content type 320. The scores for the class of tone 316 include a joyful score 322 of 0.7, a sad score 324 of 0.015, and other scores 226. As shown, the scores for the class of formality 318 include a formal score 328 of 0.97, an informal score 330 of 0, and other scores 332. The scores for the class of content type 320 include a novel score 334 of 0.12, a magazine score 336 of 0.57, and other scores 338. The context module 204 generates the context data 212 as describing the vector of context scores 314.

The identification module 206 receives the context data 212 and the replacement font data 114 and processes the context data 212 and/or the replacement font data 114 to generate identified font data 214. As illustrated in FIG. 3C, the representation 304 includes the vector of context scores 314 and additionally includes vectors of conveyance indicators for fonts 340-344 which are described by the replacement font data 114. The vector of context scores 314 includes context scores 322-338.

The vector of conveyance indicators for a first font 340 includes an indicator value of "1" for the tone class of joyful and an indicator value of "1" for the content type class of novel. The identification module 206 determines a replacement font score for the first font 340 by computing a dot product between the vector of context scores 314 and the vector of conveyance indicators for the first font 340. For example, the identification module 206 determines that the replacement font score for the first font 340 is 0.82.

The vector of conveyance indicators for a second font 342 includes an indicator value of "1" for the tone class of sad, an indicator value of "1" for the formality class of informal, and an indicator value of "1" for the content type class of magazine. The identification module 206 determines a replacement font score for the second font 342 by computing a dot product between the vector of context scores 314 and the vector of conveyance indicators for the second font 342. In one example, the identification module 206 determines that the replacement font score for the second font 342 is 0.585.

The vector of conveyance indicators for a third font 344 includes an indicator value of "1" for the tone class of joyful, an indicator value of "1" for the tone class of sad, and an indicator value of "1" for the content type class of magazine. The identification module 206 determines a replacement font score for the third font 344 by computing a dot product between the vector of context scores 314 and the vector of conveyance indicators for the third font 344. In an example, the identification module 206 determines that the replacement font score for the third font 344 is 1.285.

The identification module 206 compares the replacement font scores for the fonts 340-344 described by the replacement font data 114 and identifies the third font 344 as the replacement font. For example, the identification module 206 identifies the third font 344 as the replacement font because the third font 344 has a highest replacement font score. The identification module 206 generates the identified font data 214 as describing the replacement font as the third font 344. The raster module 208 receives the identified font data 214 and processes the identified font data 214 to generate a raster image 346 which depicts the raw text 312 rendered using the replacement font which is the third font 344 in this example.

Figure 4:
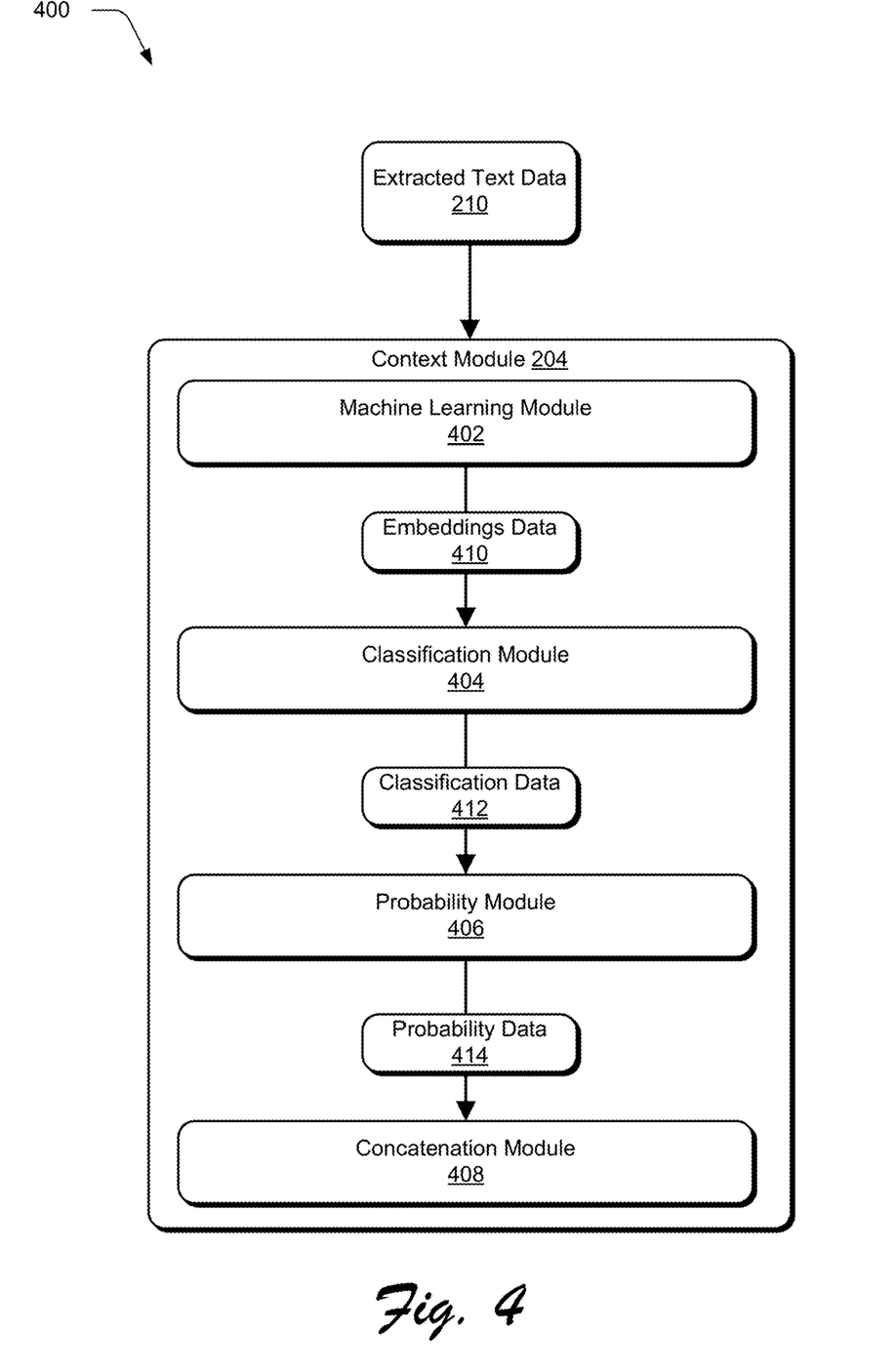
FIG. 4 depicts a system in an example implementation showing operation of a context module.

FIG. 4 depicts a system 400 in an example implementation showing operation of a context module 204. The context module 204 is illustrated to include a machine learning module 402, a classification module 404, a probability module 406, and a concatenation module 408. As illustrated in FIG. 2, the context module 204 receives the extracted text data 210 as an input and generates the context data 212 as an output. For example, the machine learning module 402 receives the extracted text data 210 and processes the extracted text data 210 to generate embeddings data 410. The machine learning module 402 includes at least one machine learning model.

As used herein, the term "machine learning model" refers to a computer representation that is tunable (e.g., trainable) based on inputs to approximate unknown functions. By way of example, the term "machine learning model" refers to a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is cable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

For example, the machine learning module 402 includes a model having bidirectional encoder representations from transformers (BERT) which is pre-trained on training data including BooksCorpus (approximately 800 million words) and English Wikipedia (approximately 2.5 billion words) to perform two unsupervised language representation tasks using WordPiece embeddings with a 30,000 token vocabulary. In the first unsupervised task, some tokens are randomly masked and the masked tokens are predicted. In the second unsupervised task, two sentences A and B are provided and whether or not sentence B is a next sentence after A is predicted. For example, the machine learning module 402 uses BERT Base Uncased with 12 layers and 768 output nodes.

The machine learning module 402 receives the extracted text data 210 which describes the raw text 312 that has been tokenized and lemmatized in one example. The machine learning module 402 processes the extracted text data 210 using the at least one machine learning model which generates the embeddings data 410. The embeddings data 410 describes token sequence embeddings that indicate contexts of the raw text 312. The classification module 404 receives the embeddings data 410 and processes the embeddings data 410 to generate classification data 412.

For example, the classification module 404 includes at least one classification layer which is trained to classify indications of contexts of the raw text 312 described by the embeddings data 410. In one example, the classification module 404 includes a tone classification layer, a formality classification layer, and a content type classification layer which are in parallel. In this example, the tone classification layer is trained using labeled training data to generate indications of a joyful class, a neutral class, an optimistic class, a pessimistic class, a friendly class, a humorous class, and/or a sad class. The tone classification layer processes the embeddings data 410 and generates tone classified embeddings data 410 and the classification module 404 generates the classification data 412 as describing the tone classified embeddings data 410.

The formality classification layer is trained using labeled training data to generate indications of a formal class, an informal class, and/or a neutral class. The formality classification layer processes the embeddings data 410 and generates formality classified embeddings data 410. The classification module 404 generates the classification data 412 as describing the formality classified embeddings data 410.

The content type classification layer is trained using labeled training data to generate indications of an academic class, a business class, a general class, an e-mail class, a report class, an article class, a novel class, a magazine class, a children's book class, a comics class, a legal class, a scientific class, and/or an advertisement class. The content type classification layer processes the embeddings data 410 and generates content type classified embeddings data 410. As shown, the classification module 404 generates the classification data 412 as describing the content type classified embeddings data 410.

The probability module 406 receives the classification data 412 and processes the classification data 412 to generate probability data 414. For example, the classification data 412 includes outputs of the tone classification layer, the formality classification layer, and the content type classification layer, and the probability module 406 includes a Softmax layer for each of the classification layers which converts the outputs of the classification layers into probabilities. In this example, the tone classification layer is trained to generate indications of the joyful class, the neutral class, the optimistic class, the pessimistic class, the friendly class, the humorous class, and the sad class and a Softmax layer of the probability module 406 converts these indications into probabilities of the classes. The formality classification layer is trained to generate indications of the formal class, the informal class, and the neutral class and a Softmax layer of the probability module 406 converts these indications into probabilities of the formal class, the informal class, and the neutral class. The content type classification layer is trained to generate indications of the academic class, the business class, the general class, the e-mail class, the report class, the article class, the novel class, the magazine class, the children's book class, the comics class, the legal class, the scientific class, and the advertisement class, and a Softmax layer of the probability module 406 converts these indications into probabilities of the classes. The probability module 406 generates the probability data 414 as describing the probabilities of the classes output by the Softmax layers.

The concatenation module 408 receives the probability data 414 and the concatenates the probability data 414 as the context data 212. For example, the concatenation module 408 processes the probability data 414 which describes a vector of probabilities for the tone category, a vector of probabilities for the formality category, and a vector of probabilities for the content type category and the concatenation module concatenates these vectors into a single vector. The concatenation module 408 generates the context data 212 as describing the single vector in one example.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 5:
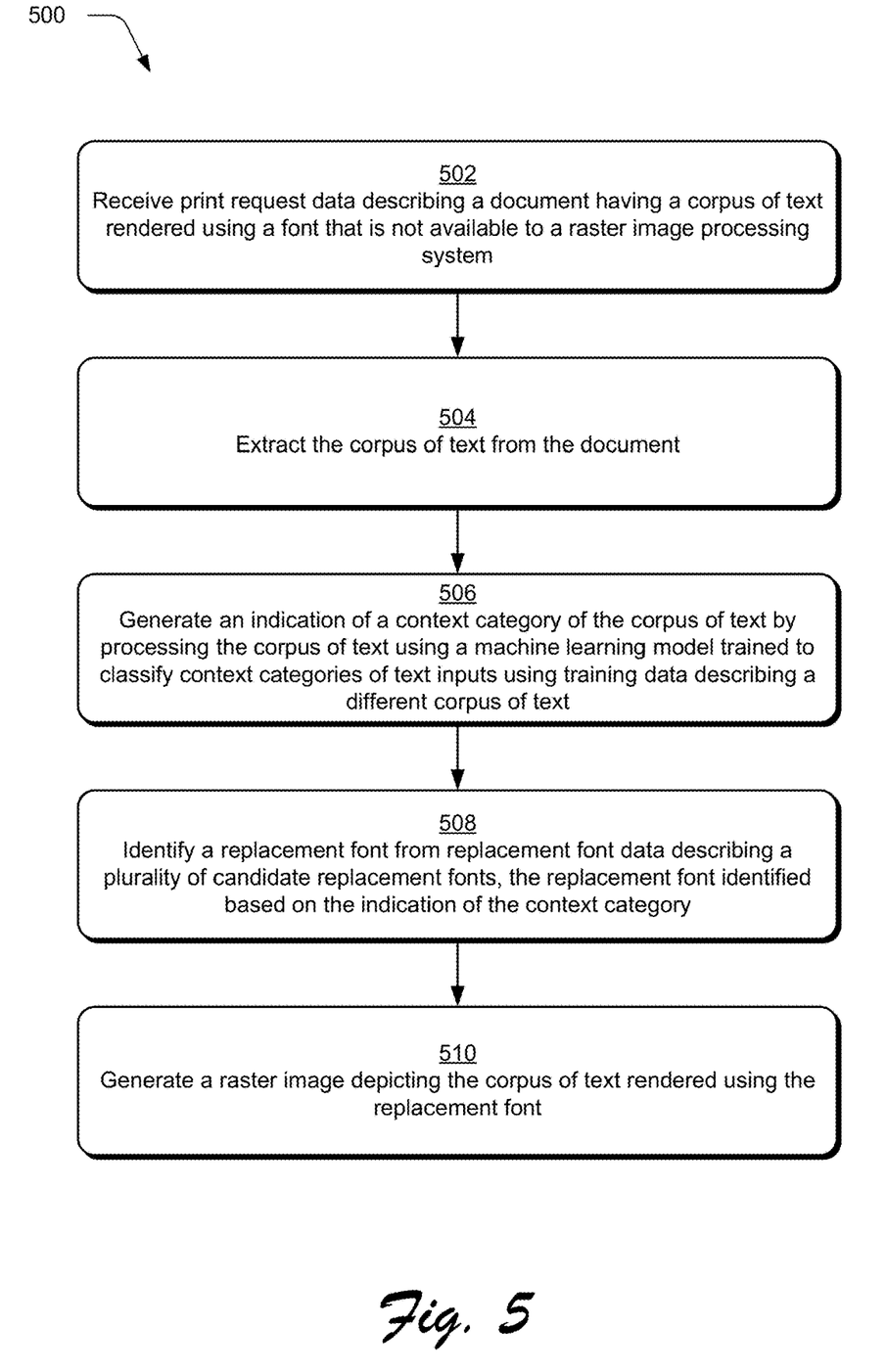
FIG. 5 is a flow diagram depicting a procedure in an example implementation in which print request data is received that describes a document having a corpus of text rendered using a font that is not available to a raster image processing system and a raster image is generated depicting the corpus of texted rendered using a replacement font.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which print request data is received that describes a document having a corpus of text rendered using a font that is not available to a raster image processing system and a raster image is generated depicting the corpus of texted rendered using a replacement font.

Print request data is received describing a document having a corpus of text rendered using a font that is not available to a raster image processing system (block 502). The computing device 102 implements the print module 112 to receive the print request data in one example. The corpus of text is extracted from the document (block 504). For example, the print module 112 extracts the corpus of text from the document. An indication of a context category of the corpus of text is generated (block 506) by processing the corpus of text using a machine learning model trained to classify context categories of text inputs using training data describing a different corpus of text. In an example, the computing device 102 implements to the print module 112 to generate the indication of the context category of the corpus of text.

A replacement font is identified (block 508) from replacement font data describing a plurality of candidate replacement fonts, the replacement font identified based on the indication of the context category. The print module 112 identifies the replacement front from the replacement font data in one example. A raster image is generated (block 510) depicting the corpus of text rendered using the replacement font. For example, the computing device 102 implements the print module 112 to generate the raster image depicting the corpus of text rendered using the replacement font.

Figure 6:
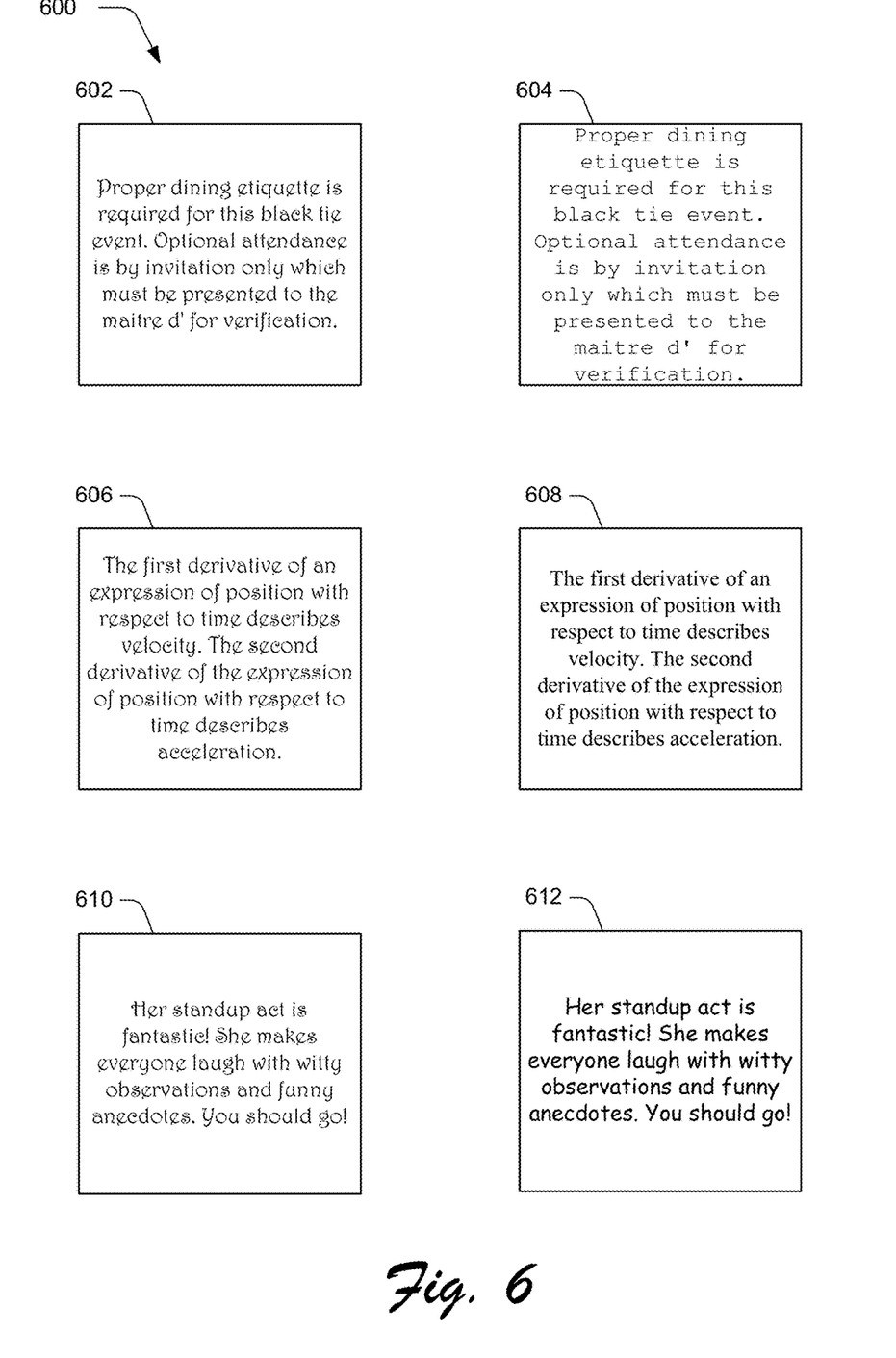
FIG. 6 illustrates a representation of text rendered using unavailable fonts and raster images depicting the text rendered using replacement fonts.

FIG. 6 illustrates a representation 600 of text rendered using unavailable fonts and raster images depicting the text rendered using replacement fonts. The representation 600 includes text rendered using an unavailable font 602. For example, the print module 112 extracts the text and generates a vector of context scores using the extracted text. In this example, a substance of the text rendered using the unavailable font 602 has a pessimistic tone. This is because "invitation only which must be presented to the maitre d' for verification" implies a pessimism with respect to the invitation in that the authenticity of the invitation must be verified. Accordingly, the vector of context scores for the text rendered using the unavailable font 602 includes a relatively high score for the tone class of pessimistic. The substance of the text rendered using the unavailable font 602 is also formal and is of general content type. As a result, the vector of context scores for the extracted text includes a relatively high score for the formality class of formal as well as a relatively high score for the content type class of general. The print module 112 accesses the replacement font data 114 and determines a replacement font score for each of the plurality of fonts described by the replacement font data 114 by computing a dot product between the vector of context scores for the extracted text and a vector of conveyance indicators for each of the plurality fonts described by the replacement font data 114. The print module 112 identifies a font having a highest replacement font score as a replacement font and generates a raster image 604 depicting the extracted text rendered using the replacement font.

The representation 600 also includes text rendered using an unavailable font 606. The print module 112 extracts the text rendered using the unavailable font 606 and generates a vector of context scores using the extracted text. In this example, a substance of the text rendered using the unavailable font 606 has a neutral tone. This is because the substance of the extracted text is strictly of a factual nature describing the significance of first and second derivatives of position with respect to time. Thus, the vector of context scores includes a relatively high score for the tone class of neutral. The substance of the text rendered using the unavailable font 606 is also formal in nature and includes academic content explaining how velocity differs from acceleration. In this example, the vector of context scores includes a relatively high score for the formality class of formal and a relatively high score for the content type class of academic. The print module 112 determines a replacement font score for each of the plurality of fonts described by the replacement font data 114. For example, the print module 112 computes a dot product between the vector of context scores for the text rendered using the unavailable font 606 and a vector of conveyance indicators for each of the plurality fonts described by the replacement font data 114. The print module 112 identifies a font having a highest replacement font score as a replacement font and generates a raster image 608 depicting the extracted text rendered using the replacement font.

The representation 600 includes text rendered using an unavailable font 610. The print module 112 extracts this text as raw text 312 in one example. The print module 112 then and generates a vector of context scores using the extracted text. In this example, the vector of context scores includes relatively high scores for tone classes of joyful, optimistic, and humorous. This is because a substance of the extracted text conveys an upbeat analysis of a comedian's standup act. For example, the substance of the text rendered using the unavailable font 610 is informal and conversational. Accordingly, the vector of context scores includes a relatively high score for the formality class of informal. In one example, the vector of context scores includes a relatively high score for the content type class of general. In another example, the vector of context scores includes a relatively high score for the content type class of advertising. In this example, the print module 112 associates a context of the text rendered using the unavailable font 610 as being persuasive and indicative of an advertisement for the comedian. The print module 112 accesses the replacement font data 114 and determines a replacement font score for each of the plurality of fonts described by the replacement font data 114 by computing a dot product between the vector of context scores for the extracted text and a vector of conveyance indicators for each of the plurality fonts described by the replacement font data 114. The print module 112 identifies a font having a highest replacement font score as a replacement font and generates a raster image 612 depicting the extracted text rendered using the replacement font.

Example System and Device

Figure 7:
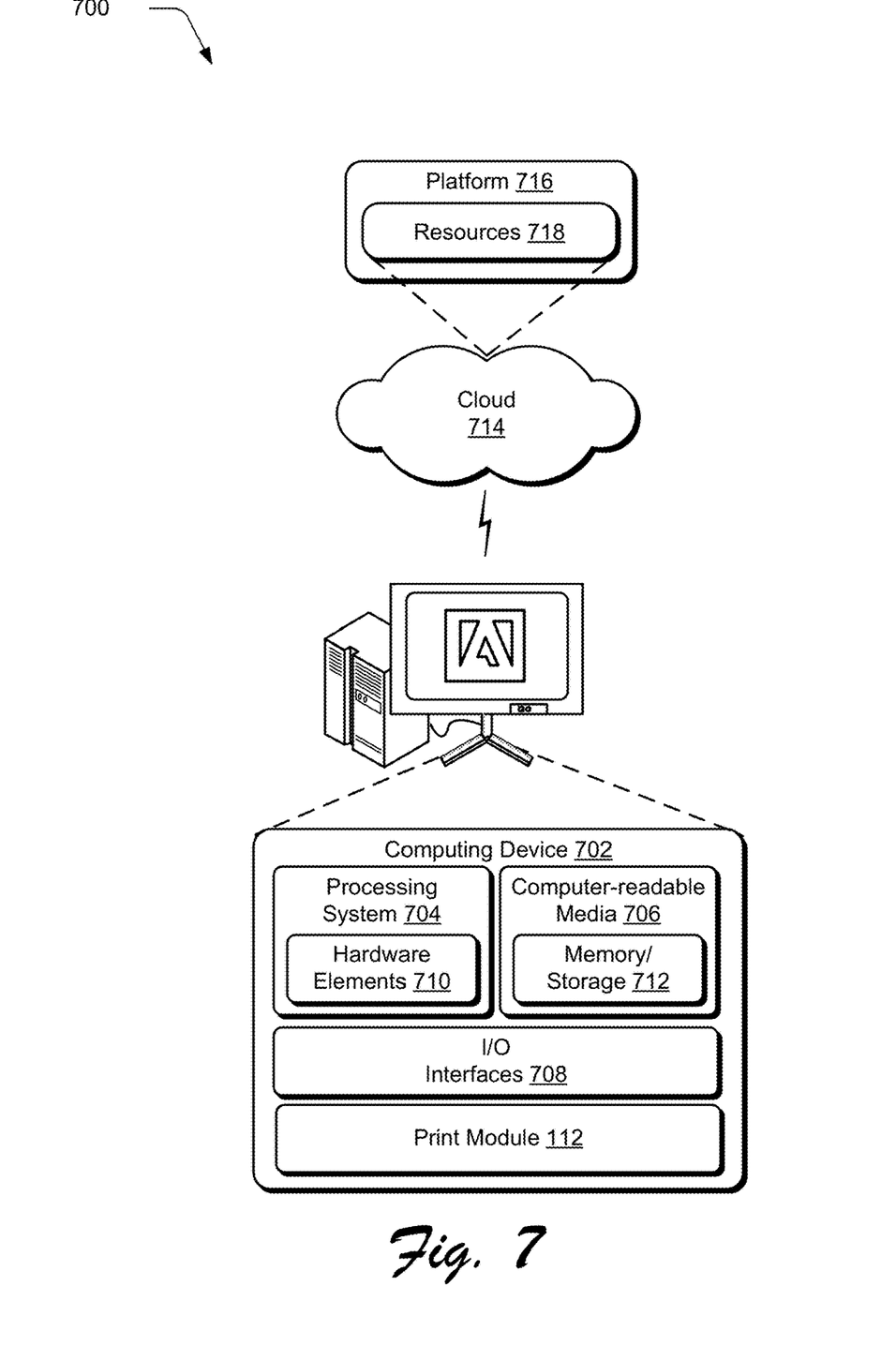
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the print module 112. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are be configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage component 712 includes volatile media (such as random access memory (RAM)) and/or nonvolatile media (such as read only memory (ROM), Flash memory, optical disks, magnetic disks, and so forth). In another example, the memory/storage component 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for font replacement in print workflows have been described in language specific to structural features and/or methods, it is to be understood that the appended claims are not necessarily limited to the specific features or methods described. Rather, the specific features and methods are disclosed as example implementations of systems for font replacement in print workflows, and other equivalent features and methods are intended to be within the scope of the appended claims. Further, various different examples are described and it is to be appreciated that each described example is implementable independently or in connection with one or more other described examples.

What is claimed is:

1. In a digital medium text printing environment, a method implemented by a computing device, the method comprising:
   receiving, by a raster image processing system of the computing device, print request data describing a document having a corpus of text rendered using a font that is not available to the raster image processing system;
   extracting, by the computing device, the corpus of text from the document the extracting includes tokenizing the corpus of text and lemmatization of the tokenized corpus of text;
   generating, by the computing device, an indication of a context category of the corpus of text by processing the corpus of text using a machine learning model trained to classify context categories of text inputs using training data describing a different corpus of text;
   identifying, by the computing device, a replacement font from replacement font data describing a plurality of candidate replacement fonts, the replacement font identified based on the indication of the context category; and
   generating, by the raster image processing system of the computing device, a raster image depicting the corpus of text rendered using the replacement font.

2. The method as described in claim 1, wherein the indication of the context category is at least one of tone, formality, or content type.

3. The method as described in claim 1, wherein the indication of the context category includes an indication of a class of the context category and the replacement font is identified at least partially based on the indication of the class of the context category.

4. The method as described in claim 3, wherein the indication of the context category is tone and the indication of the class of the context category is at least one of joyful, neutral, optimistic, pessimistic, friendly, humorous, or sad.

5. The method as described in claim 3, wherein the indication of the context category is formality and the indication of the class of the context category is at least one of formal, informal, or neutral.

6. The method as described in claim 3, wherein the indication of the context category is content type and the indication of the class of the context category is at least one of academic, business, general, e-mail, report, article, novel, magazine, children's book, comic, legal, scientific, or advertisement.

7. The method as described in claim 1, wherein the raster image is in a format usable to print the document.

8. The method as described in claim 1, further comprising:
   representing the indication of the context category as a font context vector;
   computing a first dot product of the font context vector and a vector describing the replacement font;
   computing a second dot product of the font context vector and a vector describing one of the plurality of candidate replacement fonts; and
   comparing a result of the first dot product with a result of the second dot product.

9. The method as described in claim 1, wherein the machine learning model includes bidirectional encoder representations from transformers.

10. The method as described in claim 1, further comprising determining a replacement font score for the replacement font that indicates a likelihood that the replacement font conveys a context that is also conveyed by the corpus of text.

11. In a digital medium text printing environment, a system comprising:
  an extraction module implemented at least partially in hardware of a computing device to:
    receive print request data describing a document having a corpus of text rendered using a font that is not available to the extraction module; and
    extract the corpus of text from the document;
  a context module implemented at least partially in the hardware of the computing device to generate an indication of a context category of the corpus of text by processing the corpus of text using a machine learning model trained to classify context categories of text inputs using training data describing a different corpus of text, the indication of the context category includes an indication of a class of the context category;
  an identification module implemented at least partially in the hardware of the computing device to identify a replacement font from replacement font data describing a plurality of candidate replacement fonts, the replacement font identified based on the indication of the context category and the indication of the class of the context category; and
  a raster module implemented at least partially in the hardware of the computing device to generate a rasterized image depicting the corpus of text rendered using the replacement font.

12. The system as described in claim 11, wherein the machine learning model includes bidirectional encoder representations from transformers.

13. The system as described in claim 11, wherein the indication of the context category is tone and the indication of the class of the context category is at least one of joyful, neutral, optimistic, pessimistic, friendly, humorous, or sad.

14. The system as described in claim 11, wherein the indication of the context category is formality and the indication of the class of the context category is at least one of formal, informal, or neutral.

15. The system as described in claim 11, wherein the indication of the context category is content type and the indication of the class of the context category is at least one of academic, business, general, e-mail, report, article, novel, magazine, children's book, comic, legal, scientific, or advertisement.

16. The system as described in claim 11, wherein extracting the corpus of text from the document includes tokenizing the corpus of text and lemmatization of the tokenized corpus of text.

17. One or more computer-readable storage media comprising instructions stored thereon that, responsive to execution by a computing device, causes the computing device to perform operations including:
  receiving print request data describing a document having a sequence of text rendered using an unavailable font;
  extracting the sequence of text from the document, the extracting includes tokenizing the sequence of text and lemmatization of the tokenized sequence of text;
  generating an indication of a context category of the sequence of text by processing the sequence of text with a machine learning model trained to classify context categories of text inputs using training data describing a corpus of text;
  identifying a replacement front from replacement font data describing a plurality of available fonts, the replacement font identified based on the indication of the context category; and
  generating a raster image in a format usable to print the document, the raster image depicting the sequence of text rendered using the replacement font.

18. The one or more computer-readable storage media as described in claim 17, wherein the machine learning model includes bidirectional encoder representations from transformers.

19. The one or more computer-readable storage media as described in claim 17, the operations further including:
  representing the indication of the context category as a font context vector;
  computing a first dot product of the font context vector and a vector describing the replacement font;
  computing a second dot product of the font context vector and a vector describing one of the plurality of available fonts; and
  comparing a result of the first dot product with a result of the second dot product.

20. The one or more computer-readable storage media as described in claim 17, wherein the operations further include determining a replacement font score for the replacement font that indicates a likelihood that the replacement font conveys a context that is also conveyed by the sequence of text.

* * * * *